United States Patent
Visser et al.

(10) Patent No.: US 8,467,287 B2
(45) Date of Patent: *Jun. 18, 2013

(54) HIGH AVAILABLE METHOD FOR BORDER GATEWAY PROTOCOL VERSION 4

(75) Inventors: Lance A Visser, Dallas, TX (US); Qi Ning, Dallas, TX (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/260,719

(22) Filed: Oct. 29, 2008

(65) Prior Publication Data

US 2009/0129261 A1 May 21, 2009

Related U.S. Application Data

(63) Continuation of application No. 11/819,034, filed on Jun. 25, 2007, now Pat. No. 7,499,394, which is a continuation of application No. 10/185,809, filed on Jun. 27, 2002, now Pat. No. 7,236,453.

(51) Int. Cl.
*H04L 12/56* (2006.01)

(52) U.S. Cl.
USPC ............................ 370/218; 370/389; 370/392

(58) Field of Classification Search
None
See application file for complete search history.

(56) References Cited

U.S. PATENT DOCUMENTS

| | | | |
|---|---|---|---|
| 5,216,675 A | 6/1993 | Melliar-Smith | |
| 5,519,704 A | 5/1996 | Farinacci | |
| 5,631,907 A | 5/1997 | Guarneri | |
| 5,886,991 A | 3/1999 | Guarneri | |
| 6,477,181 B1 | 11/2002 | Fujimori | |
| 6,853,617 B2 * | 2/2005 | Watson et al. | 370/218 |
| 6,876,657 B1 | 4/2005 | Brewer | |
| 6,910,148 B1 * | 6/2005 | Ho et al. | 714/4 |
| 6,938,179 B2 * | 8/2005 | Iyer et al. | 714/4 |
| 6,975,587 B1 * | 12/2005 | Adamski et al. | 370/217 |
| 6,980,537 B1 | 12/2005 | Liu | |
| 7,093,160 B2 | 8/2006 | Lau | |
| 7,236,453 B2 * | 6/2007 | Visser et al. | 370/219 |
| 7,269,133 B2 | 9/2007 | Lu | |
| 7,292,535 B2 * | 11/2007 | Folkes et al. | 370/238 |
| 7,406,035 B2 * | 7/2008 | Harvey et al. | 370/218 |
| 7,499,394 B2 * | 3/2009 | Visser et al. | 370/218 |

(Continued)

OTHER PUBLICATIONS

Sit et al; "Socket Cloning for Cluster-Based Web Servers"; Sep. 2002; IEEE; International Conference on Cluster Computing.*

(Continued)

*Primary Examiner* — Robert Scheibel
(74) *Attorney, Agent, or Firm* — Shun Yao; Park, Vaughan, Fleming & Dowler LLP

(57) ABSTRACT

High availability BGP4 is based on redundant hardware as well as redundant software that replicates the RUN state of BGP4. There are two copies, respectively active and backup, of BGP4 running on two separate redundant hardware platforms. All BGP4 internal implementations apply various methods to replicate the running state of BGP4 independently of peer network routers. When this hardware or software fails on one redundant hardware platform, peer routers are unaware of the failure. Internally, based on duplicative states, the local router recovers from the failure and keeps the protocol running. During the recovery period, the local router can bring up a backup again. In the HA architecture, these activities are not detected by peer routers, such that there is no instability to the Internet backbone caused by BGP4 failure.

15 Claims, 1 Drawing Sheet

U.S. PATENT DOCUMENTS

| | | | |
|---|---|---|---|
| 7,535,826 B1 * | 5/2009 | Cole et al. | 370/218 |
| 2003/0023701 A1 | 1/2003 | Norman | |
| 2003/0056138 A1 * | 3/2003 | Ren | 714/4 |
| 2006/0114939 A1 * | 6/2006 | Singh | 370/469 |
| 2009/0219804 A1 * | 9/2009 | Cole et al. | 370/218 |

OTHER PUBLICATIONS

Sit et al; "Cyclone: A High-Performance Cluster-Based Web Server with Socket Cloning"; Cluster Computing; 2004; pp. 21-37.*
Sit, Yiu-Fai, et al; "Cluster-Based Web Server with Socket Cloning"; Apr. 24, 2002.*
Yiu-Fai Sit, Cho-Li Wang, Francis Lau, "Cyclone: A High-Performance Cluster-Based Web Server with Socket Cloning", Cluster Computing: The Journal of Networks, Software Tools and Application, Special Issue on Cluster Computing in the Internet, Jun. 6, 2002, vol. 7, pp. 21-37, 2004.*
U.S. Appl. No. 10/153,500, filed May 16, 2002, Folkes, et al.
U.S. Appl. No. 09/852,223, filed May 9, 2001, Watson, et al.
U.S. Appl. No. 09/703,057, filed Oct. 31, 2000, Brewer, et al.
Communication dated Oct. 8, 2003 with attached European Search Report for EP 03253814.2.
Miercom: "Lab Testing Summary Report", Miercom Testing Report, Apr. 24, 2002.
Cisco: "Cisco's flagship switching platform scales to enhance E-commerce Networks" Cisco News Release, Sep. 19, 2000.
Cisco: "Cisco's High Availability Initiatives" Cisco Stateful Switchover (SSO) and Non Stop Forwarding (NSF) Technics, Feb. 7, 2002.
"Index of /cl{wang/papers", Server Publication List, Jul. 24, 2003.
Wang, Cho-Li et al., "Cluster Based Web Server with Socket Cloning", Apr. 24, 2002.
McPherson, Danny "Bolstering IP Routers for High Availability", CommsDesign, Communication Systems Design, Apr. 2, 2001. http://www.commsdesign.com/story/DEG20010323S0048.
Chiaro: "Stateful Assured Routing (STAR)" Chiaro Whitepapers, Nov. 18, 2002, pp. 1-10.
Stewart, J. III, "BGP4: Inter-Domain Routing in the Internet," Addison-Wesley, 1998.
Rekhter, Y., et al., "A Border Gateway Protocol 4 (BGP-4)," IETF RFC 1774, 1995; RFC1771, http://www.Ietf.org/rfc/rfc1771.txt.
Stevens, Richard w., "TCP/IP Illustrated, vol. 1," The Protocols, Oct. 1999, pp. 226, 503-506.
Metz, Christopher "IP Protection and Restoration," Cisco Systems, IEEE Internet Computing, Mar., Apr. 2002, pp. 97-102.
Communication dated Nov. 9, 2002 with attached European Search Report for EP 02253109.9.
White Paper, "The Evolution of High-End Router Architectures, Basic Scalability and Performance Considerations for Evaluating Large-Scale Router Designs", Jan. 31, 2001, pp. 1-11.
"Cisco 7500 Series," Product Announcement, pp. 1-17, 1997.
Zhang, Yongguang et al., "A 'Persistent Connection' Model for a Mobile and Distributed Systems," pp. 300-307, Sep. 20, 1995.
"Fault-Tolerant Architecture for Communication Adapters and Systems," IBM Technical Disclosure Bulletin, vol. 35, No. 7, Dec. 2002, pp. 300-303.
Communication dated Aug. 21, 2003 with attached European Search Report for EP 03252645.1.
Doyle, Jeff "CCIE Professional Development Routing TCP/IP," vol. 1, 1998, pp. 409-584, Macmillan Technical Press, Indianapolis, USA.

* cited by examiner

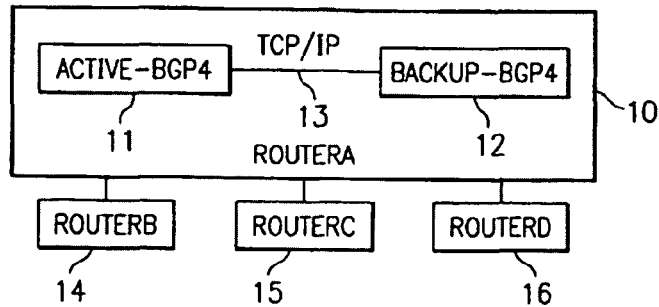
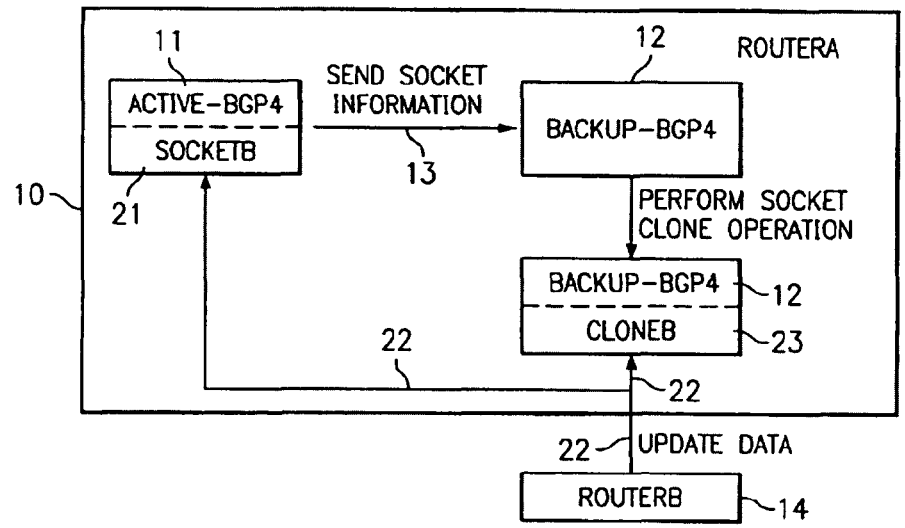
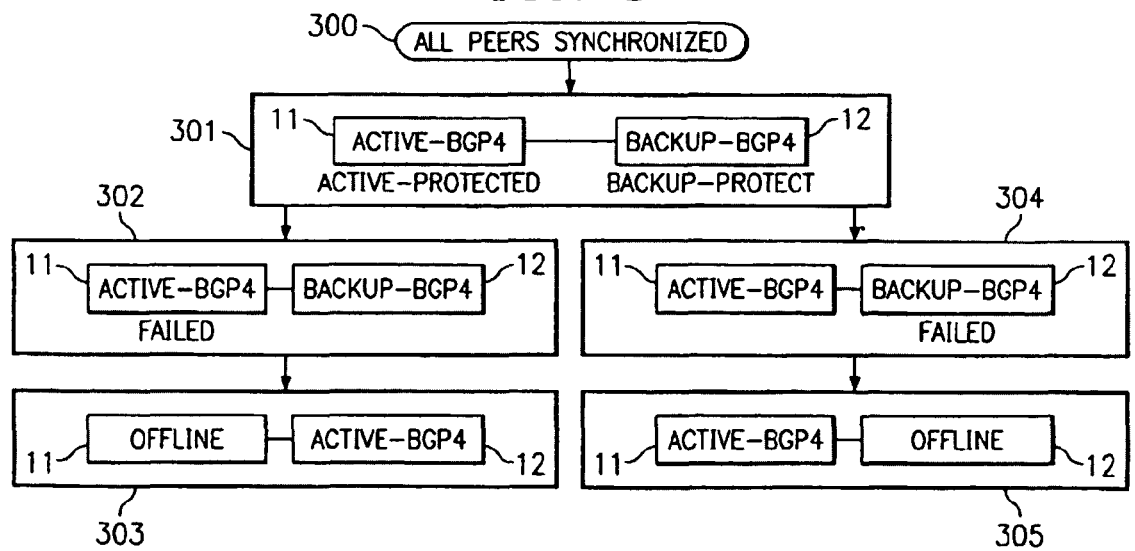

HIGH AVAILABLE METHOD FOR BORDER GATEWAY PROTOCOL VERSION 4

CROSS-REFERENCE TO RELATED APPLICATIONS

This application is a continuation of U.S. application Ser. No. 11/819,034, filed on Jun. 25, 2007, which is a continuation of U.S. application Ser. No. 10/185,809, filed on Jun. 27, 2002, now U.S. Pat. No. 7,236,453. This application claims priority to all of these applications. This application is also related to commonly assigned U.S. application Ser. No. 09/852,223, entitled "SYSTEM AND METHOD FOR TCP CONNECTION PROTECTION SWITCHING," filed May 9, 2001, now U.S. Pat. No. 6,853,617; and commonly assigned U.S. application Ser. No. 10/153,500, entitled "HIGHLY AVAILABLE OSPF ROUTING PROTOCOL," filed May 23, 2002, now U.S. Pat. No. 7,292,535; the disclosures of which are hereby incorporated herein by reference.

TECHNICAL FIELD

The invention relates to network routers, and more particularly to highly available Border Gateway Protocol (BGP).

BACKGROUND OF THE INVENTION

BGP Version 4 (BGP4) is used today on the Internet backbone as a major routing protocol (see for example, Y. Rekhter and T. Li, "A Border Gateway Protocol 4 (BGP-4)," IETF RFC 1774, (1995); RFC1771, http://www.ietf.org/rfc/rfc1771.txt; and J. W. Stewart III, "BGP4: Inter-Domain Routing in the Internet," Addison-Wesley (1998)). BGP4 uses TCP/IP to connect peer routers. These routers are called BGP speakers. If a pair of routers has established a BGP connection, then they are said to be peers to each other. A router can have more than one BGP peer. BGP peer connection goes through a negotiating session in which connecting peers exchange OPEN messages, containing router ID, as numbers etc. If negotiations are successful, then the peer connection is said to be established. Routers will send route update messages, which will either advertise new prefixes or withdraw previously advertised prefixes. A prefix contains an IP address and IP mask pair, which define the reachability of the network represented by the prefix. Normally, a BGP speaker will establish connections to several peer BGP speakers. Hence, a BGP speaker receives (and sends) prefix updates from/to these multiple peers.

A BGP speaker will select its best routes among the received and self-configured routes. The selection procedure can be simple or complex, depending on the router route-selection-policy configuration. The best routes will be used for data forwarding of the router. A BGP speaker sends an update of only its best routes to a peer BGP speaker.

Almost all the Internet traffic is controlled by BGP4, and Internet stability is of great importance. Any disruption to Internet backbone routing caused by hardware and/or software failure will affect substantially all network entities. The stability of backbone routing is heavily dependent upon both hardware and software stability. The platforms that run BGP4 software can crash, and any of these failures will cause instability on the Internet backbone. Other prior art solutions use redundant hardware. Nevertheless, the peer routers on the Internet backbone still detect peer routers going down and up, which will cause instability in the backbone.

BRIEF SUMMARY OF THE INVENTION

The present invention is described herein is a high availability (HA) method for BGP4 that seamlessly hides router failures from Internet peers.

High availability BGP4, in accordance with embodiments of the present invention, is based on redundant hardware as well as redundant software that replicates the RUN state of BGP4. There are two copies, respectively active and backup, of BGP4 running on two separate redundant hardware platforms. All BGP4 internal implementations apply various methods to replicate the running state of BGP4 independently of peer network routers. When this hardware or software fails, (for example, BGP4 fails on one redundant hardware platform), peer routers are unaware of the failure. Internally, based on duplicative states, the local router recovers from the failure and keeps the protocol running. In the HA architecture, these activities are not detected by peer routers, such that there is no instability to the Internet backbone caused by BGP4 failure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 is a block diagram illustrating a hardware overview of a HA-BGP4 system, in accordance with embodiments of the present invention;

FIG. 2 is a block diagram illustrating information flow in a HA-BGP4 protocol environment; and FIG. 3 is a block diagram representing the state of HA instances ACTIVE-BGP4 and BACKUP-BGP4 during failover and recovery.

DETAILED DESCRIPTION OF THE INVENTION

Dynamic routing protocols are protocols that routers use to communicate with each other, to decide where the traffic goes on the Internet. In "Highly available (HA) routing protocols", routing fails over completely seamlessly. The outside world is unaware that there has been a fault from one router to another. The backup software and the backup router take over seamlessly, such that the outside world is unaware that there has been a problem. During this recovery process, a central switch fabric in the central data plane of the router continues to forward transit traffic in accordance with routing instructions in forwarding tables created and maintained by the control plane.

A number of different architectures build on each other to attain this eventual goal of 'high availability.'

The first set of architectures relate to a number of concepts, one of which is TCP socket fail-over (see U.S. application Ser. No. 09/852,223, cited above, the disclosure of which has been incorporated herein by reference). TCP protocol was not designed so that one computer could quickly take over from another in the event of a TCP failure, but was designed so that one computer could talk to another in a one-to-one relationship. Border Gateway Protocol (BGP) uses TCP sockets to communicate with other routers. Consequently, the groundwork to make BGP highly available needed a reliable TCP connection that could be taken over seamlessly by another computer without interruption.

BGP exists in an environment of other software, including an operating system which provides services that BGP relies on, for example fail-over detection and message flow-through. Specifically the operating system is responsible for synchronizing the active network interface configuration with the backup. When the backup boots, the operating system on the active is responsible for making sure that certain interfaces exist on the backup. Once that is done, routing software is responsible for synchronizing the static command line configuration from the active dynamic routing protocol (DRP) to the backup DRP. That includes, for example, setting addresses on the interfaces and certain other attributes, which are basically configuration items that are manually entered at the command line.

In the high availability architecture, BGP4 is run on two redundant physically separated master control units, such that one is active BGP4 instance and the other is backup BGP4 instance. The two BGP4s are supported by completely separate hardware and OS software linked by a network that supports TCP/IP. The active BGP4 instance will be brought up first, and can establish BGP4 peer connections and exchange routing information with the peers, just as a conventional BGP4 instance would do. The backup BGP4 instance will be brought up after the active instance is up. The backup BGP4 does not listen for new peer connections, but will signal the active BGP4 to show its presence through the TCP/IP network linking the active and the backup.

FIG. 1 is a block diagram illustrating a hardware overview of a HA-BGP4 system, in accordance with embodiments of the present invention. RouterA 10 contains two separate control plane hardware processors, indicated by ACTIVE-BGP4 11 and BACKUP-BGP4 12. ACTIVE-BGP4 11 runs the active BGP4 protocol software, and BACKUP-BGP4 12 runs the backup BGP4 protocol software. Link 13 between ACTIVE-BGP4 11 and BACKUP-BGP4 12 is a network that supports TCP/IP protocols. One example of such a network is ethernet. RouterB 14, RouterC 15 and RouterD 16 are BGP peer routers that have established BGP connections with RouterA 10.

ACTIVE-BGP4 11 will be brought up to establish BGP connections with BGP peers, i.e. RouterB 14, RouterC 15 and RouterD 16. When the connections are established, ACTIVE-BGP4 11 and BGP peers 14, 15, 16 exchange prefix routing information. This is usually called exchange of BGP routing tables between the peers. ACTIVE-BGP4 11 selects its best routes among all of its received and self-configured routes. A basic best route selection process is defined in RFC 1771. Although most modern BGP4 implementations use more complicated rules for selecting best routes, these enhancements are not relevant to high availability BGP4. ACTIVE-BGP4 11 advertises only its best routes to BGP peers 14, 15, 16.

BACKUP-BGP4 12 can be brought up at any time after ACTIVE-BGP4 11 is up. BACKUP-BGP4 12 signals ACTIVE-BGP4 11 to indicate its existence. This can be accomplished by, but is not limited to, establishing a TCP/IP connection, for example link 13, between ACTIVE-BGP4 11 and BACKUP-BGP4 12. Active BGP4 instance 11 begins a synchronization process with backup BGP4 instance 12 by copying its running configuration to backup BGP4 12. Then for each established BGP4 connection to a peer router 14, 15, 16, active BGP4 instance 11 transmits the routes learned from that peer router to backup BGP4 instance 12. Backup BGP4 instance 12 processes the routes from each peer router 14-16 just as they were learned by the peer, except that backup BGP4 instance 12 does not advertise anything to any peers.

Active BGP4 instance 11 then clones onto backup BGP4 instance 12 a TCP socket that represents each peer connection. This socket cloning operation is supported by operating system capabilities (see U.S. application Ser. No. 09/852,223, cited above, the disclosure of which has been incorporated herein by reference). When socket cloning is complete, active BGP4 11 and backup BGP4 12 can start reading from the cloned sockets to learn routes from peer routers 14-16. Only active BGP4 instance 11 advertises new routes to the peer, whereas backup BGP4 12 does not advertise any routes. All new connection operations, close operations, notification operations, new configuration changes, and the like are handled by active BGP4 instance 11 and are reflected through the cloned sockets onto backup BGP4 instance 12.

Then ACTIVE-BGP4 11 and BACKUP-BGP4 12 perform operation to establish running state synchronization. ACTIVE-BGP4 11 sends its running configuration to BACKUP-BGP4 12 through link 13.

For each connected BGP peer, for example RouterB 14, ACTIVE-BGP4 11 sends the routes received from RouterB 14 to BACKUP-BGP4 12, which processes these routes just as if sent directly from RouterB. FIG. 2 is a block diagram illustrating routing information flow in a HA-BGP4 protocol environment. SocketB 21 represents the socket that connects RouterA 10 to RouterB 14. The socket that represents TCP/IP connection 22 between ACTIVE-BGP4 11 and RouterB 14 is cloned onto BACKUP-BGP4 12 as cloneB 23. This clone operation is supported on the operating system, for example CHIAROS (see U.S. application Ser. No. 09/852,223, cited above, the disclosure of which has been incorporated herein by reference). After this clone operation is successful, TCP data 22 sent from RouterB 14 is received by both ACTIVE-BGP4 11 and BACKUP-BGP4 12. However, only ACTIVE-BGP4 11 performs route update, listens for new BGP peer connection requests, and performs new connections. RouterB 14 is then marked SYNCHRONIZED. If there exist other connection-established peers, for example, RouterC 15 and RouterD 16, that are not marked SYNCHRONIZED, then the operations described above in connection with FIG. 2 are repeated for each such peer.

FIG. 3 is a block diagram representing the state of HA instances ACTIVE-BGP4 11 and BACKUP-BGP4 12 during fail-over and recovery. At step 301, after all connected BGP peers 14, 15, 16 are marked SYNCHRONIZED, as described above in connection with FIG. 2, ACTIVE-BGP4 11 is marked ACTIVE-PROTECTED and BACKUP-BGP4 12 is marked BACKUP-PROTECT. When active BGP4 instance 11 has copied all of its route database to backup BGP4 instance 12 and has cloned all its established peer connection sockets, it enters an ACTIVE-PROTECTED state. At the same time, backup BGP4 instance 12 enters a BACKUP-PROTECT state. After this state is reached, if ACTIVE-BGP4 11 fails at step 302, then at step 303 BACKUP-BGP4 12 transitions to become new ACTIVE-BGP4 12, and will start to listen for new connections and to send updates, while failed ACTIVE-BGP4 remains offline.

Alternatively, if BACKUP-BGP4 12 fails in the ACTIVE-PROTECTED/BACKUP-PROTECT state as at step 304, then ACTIVE-BGP4 11 continues at step 305 as active BGP instance without losing any BGP peer connections, while failed BACKUP-BGP4 12 remains offline. During any phase described above, if backup BGP4 instance 12 fails, active BGP4 instance 11 is not affected, and BGP4 peer routers 14-16 will not detect that anything has happened.

After BGP4 instances 11, 12 enter ACTIVE-PROTECTED/BACKUP-PROTECT states, if a hardware/software failure, for example power failure, software abnormal exit, or operator-forced failover or offline operation occurs on active BGP4 instance 11, backup BGP4 instance 12 cooperatively with the OS detects the failure on active BGP4 instance 11 within one second, and backup BGP4 instance 12 transitions itself to become new active BGP4 instance 12. While backup BGP4 12 transitions itself to become active BGP4 12, all existing established peer connections are kept intact. The connected peers will remain unaware that anything different has happened. After backup BGP4 12 transitions itself to new active BGP4 12, it starts to listen for new connections from peer routers and to advertise routes, as needed.

When failed active BGP4 instance 11 is eventually repaired or upgraded and operable, for example with new hardware or new software or both, it can be brought up again to become new backup BGP4 instance 11, and a complete life-cycle starts again.

The benefit of this method is that RouterA 10 can tolerate a single point failure such that its BGP peers 14-16 cannot detect the failure. More stable Internet routing can thereby be achieved and maintained.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   maintaining a first routing-protocol instance in a first control unit in a router;
   maintaining a second routing-protocol instance in a second control unit in the router, wherein the first control unit and second control unit are on separate hardware;
   maintaining a first transmission-layer socket in the first routing-protocol instance for communication between the router and a peer router;
   cloning onto the second routing-protocol instance a second transmission-layer socket based on the first transmission-layer socket; and
   simultaneously receiving route-related data from the peer router at the first and second routing-protocol instances via the first and second sockets, respectively.

2. The method of claim 1, wherein the routing protocol is Border Gateway Protocol (BGP).

3. The method of claim 1, further comprising synchronizing the configuration between the first routing-protocol instance and the second routing-protocol instance.

4. The method of claim 1, wherein the first routing-protocol instance and second routing-protocol instance are maintained by separate operating system software.

5. The method of claim 1, wherein the first routing-protocol instance is an active instance and the second routing-protocol instance is a backup instance; and
   wherein in response to a failure in the router, the method further comprises activating the second routing-protocol instance without the failure being detected by the peer router.

6. A routing system, comprising:
   a processor;
   a memory;
   a first control unit maintains a first routing-protocol instance and a first transmission-layer socket in the first routing-protocol instance for communication between the router and a peer router; and
   a second control unit maintains a second routing-protocol instance, wherein the first control unit and second control unit are on separate hardware;
   wherein the second routing-protocol instance comprises a second transmission-layer socket that is cloned based on the first transmission-layer socket; and
   wherein the first and second routing-protocol instances simultaneously receive route-related data from the peer router via the first and second sockets, respectively.

7. The routing system of claim 6, wherein the routing protocol is Border Gateway Protocol (BGP).

8. The routing system of claim 6, wherein the configuration between the first routing-protocol instance and the second routing-protocol instance is synchronized.

9. The routing system of claim 6, wherein the first routing-protocol instance and second routing-protocol instance are maintained by separate operating system software.

10. The routing system of claim 6, wherein the first routing-protocol instance is an active instance and the second routing-protocol instance is a backup instance; and
    wherein in response to a failure in the router, the second routing-protocol instance is activated without the failure being detected by the peer router.

11. A routing means, comprising:
    a first control means for maintaining a first routing-protocol instance and a first transmission-layer socket means for communication between the routing means and peer router; and
    a second control means for maintaining a second routing-protocol instance, wherein the first control means and second control means are on separate hardware;
    wherein the second routing-protocol instance comprises a second transmission-layer socket means that is cloned based on the first transmission-socket means; and
    wherein the first and second routing-protocol instances simultaneously receive route-related data from the peer router via the first and second socket means, respectively.

12. The routing means of claim 11, wherein the routing protocol is Border Gateway Protocol (BGP).

13. The routing means of claim 11, wherein the configuration between the first control means and the second control means is synchronized.

14. The routing means of claim 11, wherein the first control means and second control means are maintained by separate operating system software.

15. The routing means of claim 11, wherein the first control means is an active means and the second control means is a backup means; and
   wherein in response to a failure in the routing means, the second control means is activated without the failure being detected by the peer router.

* * * * *